United States Patent
Kochman (10) Patent No.: US 9,439,391 B2
(45) Date of Patent: Sep. 13, 2016

(54) DAIRY MILKING DEVICES AND METHODS

(71) Applicant: Lauren AgriSystems, Ltd., New Philadelphia, OH (US)

(72) Inventor: Aaron Kyle Kochman, Gnadenhutten, OH (US)

(73) Assignee: Lauren AgriSystems, Ltd., New Philadelphia, OH (US)

(*) Notice: Subject to any disclaimer, the term of this patent is extended or adjusted under 35 U.S.C. 154(b) by 213 days.

(21) Appl. No.: 14/100,639

(22) Filed: Dec. 9, 2013

(65) Prior Publication Data

US 2014/0165918 A1 Jun. 19, 2014

Related U.S. Application Data

(60) Provisional application No. 61/734,940, filed on Dec. 7, 2012.

(51) Int. Cl.
| | |
|---|---|
| *A01J 5/04* | (2006.01) |
| *A01J 7/00* | (2006.01) |
| *A01J 5/16* | (2006.01) |
| *A01J 5/00* | (2006.01) |
| *A01J 5/08* | (2006.01) |
| *A01J 5/06* | (2006.01) |

(52) U.S. Cl.
CPC .. *A01J 7/00* (2013.01); *A01J 5/00* (2013.01); *A01J 5/041* (2013.01); *A01J 5/06* (2013.01); *A01J 5/08* (2013.01); *A01J 5/16* (2013.01)

(58) Field of Classification Search
CPC .................................. A01J 5/041; A01J 5/16
USPC ...................................................... 119/14.51
See application file for complete search history.

(56) References Cited

U.S. PATENT DOCUMENTS

| | | | |
|---|---|---|---|
| 1,239,923 A | 9/1917 | Leitch | |
| 1,249,134 A | 12/1917 | Leitch | |
| 1,312,941 A | 8/1919 | Anderson | |
| 2,136,956 A * | 11/1938 | Schmitt | A01J 5/041 119/14.45 |
| 2,334,481 A | 11/1943 | Da Silveira | |
| 2,408,390 A | 10/1946 | Gessler | |
| 2,425,873 A * | 8/1947 | Gessler | A01J 5/041 119/14.55 |
| 2,429,983 A * | 11/1947 | Bender | A01J 5/041 119/14.45 |
| 2,502,362 A | 3/1950 | Babson | |
| 2,518,589 A | 8/1950 | Anderson | |
| 2,610,609 A * | 9/1952 | Thomas | A01J 5/041 119/14.54 |
| 2,777,420 A * | 1/1957 | Schilling | A01J 5/041 119/14.02 |

(Continued)

FOREIGN PATENT DOCUMENTS

| | | |
|---|---|---|
| DE | 1011212 B | 6/1957 |
| EP | 1425959 A2 | 6/2004 |
| EP | 1185165 B1 | 12/2004 |

*Primary Examiner* — Kristen C Hayes
(74) *Attorney, Agent, or Firm* — Zollinger & Burleson Ltd.

(57) ABSTRACT

A milking liner includes an integrated short air tube and short milk tube. In one configuration, the pulsation air is delivered through the bead of the milking liner directly inside the shell when the liner is connected to the shell. In another configuration, the integrated short air tube has an outlet outside the shell. The disclosure also provides aligned nipple pairs on the claw top. One configuration is provided wherein the pulsation nipples and air fork are integrated with the claw that has the liner nipples. Another configuration is provided wherein the air fork is separate from the claw. A method of readily supplying pulsation air to a shell includes the step of integrated the step of connecting the short air tube and the shell with the step of connecting the shell to the milking liner.

16 Claims, 8 Drawing Sheets

(56) References Cited

U.S. PATENT DOCUMENTS

| | | | | |
|---|---|---|---|---|
| 2,997,980 | A | 8/1961 | Noorlander | |
| 3,029,787 | A * | 4/1962 | Lamberson | A01J 5/041 119/14.45 |
| 3,150,637 | A * | 9/1964 | Fosnes | A01J 5/041 119/14.54 |
| 3,255,732 | A | 6/1966 | Raht | |
| 3,762,371 | A | 10/1973 | Quayle et al. | |
| 4,253,419 | A | 3/1981 | Yang | |
| 4,403,568 | A | 9/1983 | Fukuhara et al. | |
| 4,530,307 | A | 7/1985 | Thompson | |
| 4,537,152 | A | 8/1985 | Thompson | |
| 4,807,566 | A | 2/1989 | Chowdhury | |
| 4,846,108 | A | 7/1989 | Meermoller | |
| 4,907,535 | A | 3/1990 | Matsuzawa et al. | |
| 5,069,162 | A | 12/1991 | Thompson et al. | |
| 5,076,211 | A | 12/1991 | Tonelli | |
| 5,134,967 | A | 8/1992 | Marshall | |
| 5,178,095 | A | 1/1993 | Mein | |
| 5,224,442 | A | 7/1993 | Davies | |
| 5,291,853 | A | 3/1994 | Steingraber et al. | |
| 5,482,004 | A | 1/1996 | Chowdhury | |
| 5,590,622 | A * | 1/1997 | Wilson | A01J 5/041 119/14.54 |
| 6,006,695 | A * | 12/1999 | Gustafsson | A01J 5/041 119/14.54 |
| 6,039,001 | A | 3/2000 | Sanford | |
| 6,058,880 | A | 5/2000 | Gustafsson et al. | |
| 6,164,243 | A | 12/2000 | Larson | |
| 6,298,807 | B1 | 10/2001 | Terwilleger | |
| 6,308,656 | B1 | 10/2001 | Milbrath et al. | |
| 6,401,655 | B1 | 6/2002 | Terwilleger | |
| 6,435,132 | B1 | 8/2002 | Milbrath et al. | |
| 6,543,382 | B1 | 4/2003 | Kolstad et al. | |
| 6,631,694 | B1 | 10/2003 | Chowdhury | |
| 6,722,310 | B1 | 4/2004 | Alveby et al. | |
| 6,745,718 | B1 | 6/2004 | Chowdhury | |
| 6,776,120 | B1 | 8/2004 | Chowdhury | |
| 6,789,501 | B2 | 9/2004 | Brown | |
| 6,796,272 | B1 | 9/2004 | Chowdhury | |
| 6,981,468 | B1 | 1/2006 | Steingraber et al. | |
| 7,021,239 | B2 * | 4/2006 | Steingraber | A01J 5/041 119/14.54 |
| 7,578,260 | B2 | 8/2009 | Shin | |
| 7,856,942 | B2 | 12/2010 | Pettersson et al. | |
| 7,975,647 | B2 | 7/2011 | Saho, III et al. | |
| 8,302,561 | B2 | 11/2012 | Laney et al. | |
| 2002/0088402 | A1 | 7/2002 | Buecker | |
| 2004/0050334 | A1 | 3/2004 | Miller | |
| 2004/0094096 | A1 | 5/2004 | Fransen et al. | |
| 2009/0151641 | A1 | 6/2009 | Schulze et al. | |
| 2014/0190416 | A1 | 7/2014 | Kochman et al. | |
| 2015/0196003 | A1 * | 7/2015 | Brayer | A01J 5/007 119/14.08 |

* cited by examiner

DAIRY MILKING DEVICES AND METHODS

CROSS REFERENCE TO RELATED APPLICATIONS

This application claims the benefit of U.S. Provisional Patent Application Ser. No. 61/734,940 filed Dec. 7, 2012; the disclosures of which are incorporated herein by reference.

BACKGROUND OF THE DISCLOSURE

1. Technical Field

The disclosure relates to one or more of the following items individually and in combination: vacuum dairy milking machinery, both manually-connected and robotically-connected; methods for extracting milk from dairy animals, milk claws, milk claw tops, pulsation caps (air dividers or air forks) used in conjunction with milk claws, the arrangement of pulsation nipples and liner nipples, milking liners, short milk tubes, short air tubes, milking liner and shell combinations, and method of delivering pulsation air to a milking liner and shell combination.

2. Background Information

Dairy milking machines are well known in the art. One common form of these machines includes a claw 2 (see FIG. 1) that typically has four liner nipples 4 that each receives an end of a short milk tube 6 which is, in turn, connected to (or integral with) a teat cup assembly 8 that is attached to a teat to extract milk. Each teat cup assembly includes a rigid (hard plastic or metal) shell with a resilient milking liner (also known as a milking inflation) disposed at least partially within the shell. The combination of claw 2 attached to four teat cup assemblies is known as a cluster. An alternating or pulsating vacuum is applied to each teat cup assembly 8 through a short air tube 10 to cause the liner inside the shell to collapse and expand and thereby massage and suck milk from the teats. The milk flows from the liners, into the short milk tube 6, to the liner nipples 4 of the claw 2, and from there through a milk hose 12 to a collection tank.

Figure 1:
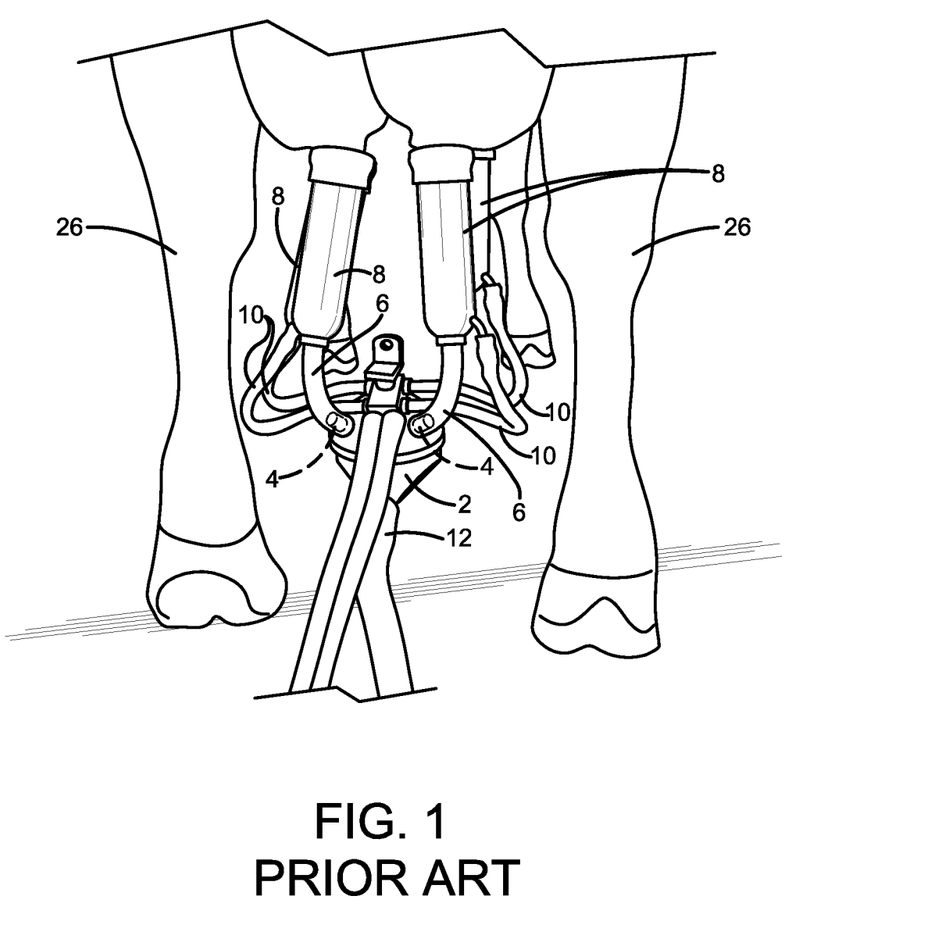
FIG. 1 is a view of a prior art milking cluster attached to the udder of a cow showing how the short air tubes bow away from the short milk tubes.

Claw 2 depicted in FIG. 1 has a typical arrangement wherein four liner nipples 4 project outwardly (away from the center of claw 2) and upwardly (toward the udder when claw 2 is in use) from four quadrants of claw 2 such that they are generally directed toward the location of the teats. These liner nipples 4 are spaced and angled to provide a predetermined alignment to the four teats on the cow's udder. The angle of alignment is commonly 20 to 50 degrees to the horizontal axis of claw 2. Another variation of the claw structure is a nippleless claw where the milking liner or short milk tube plugs directly into the claw top. The angle of the liner/short milk tube coming out of the top of the claw may be about 70 to 80 degrees to the horizontal axis of the claw.

Figure 2:
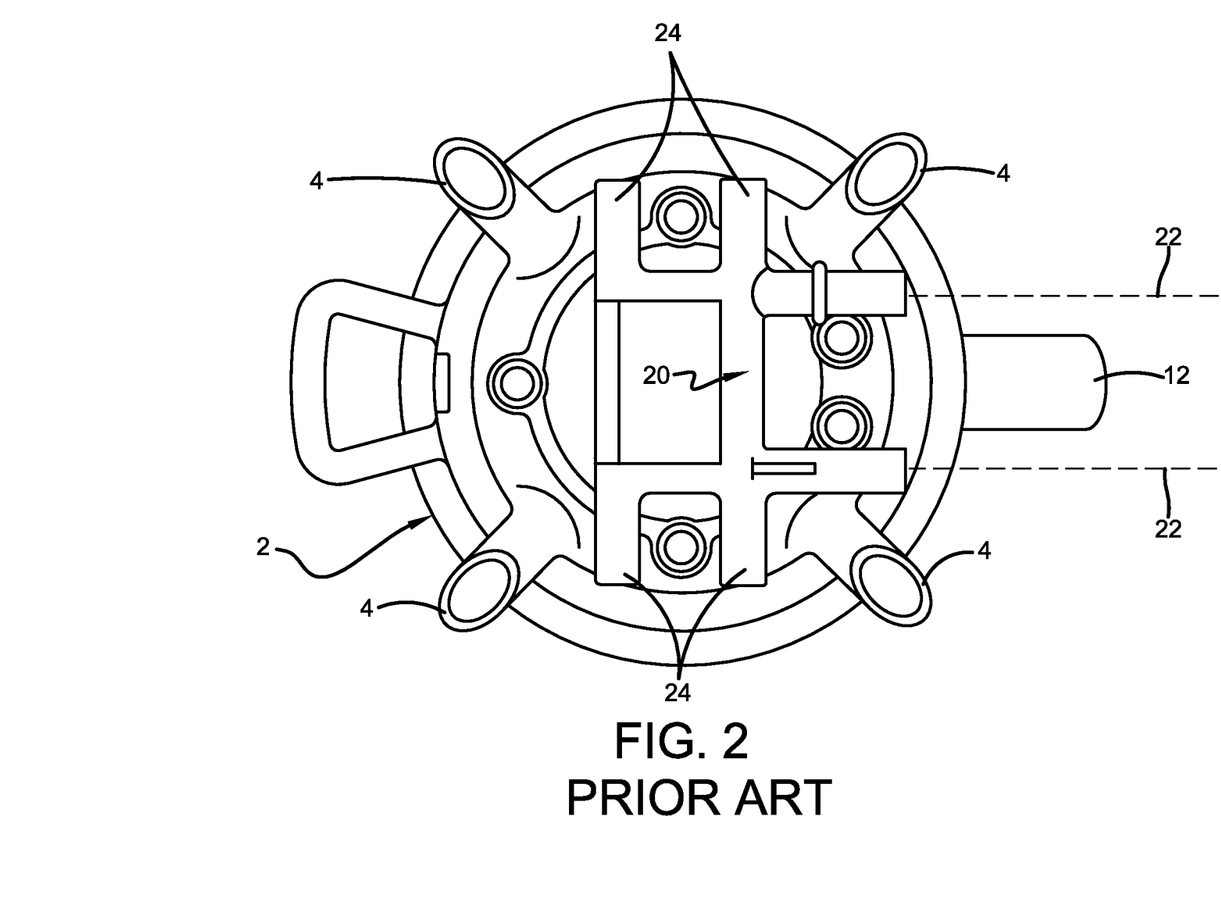
FIG. 2 is a top view of a prior art claw and air fork.
Figure 3:
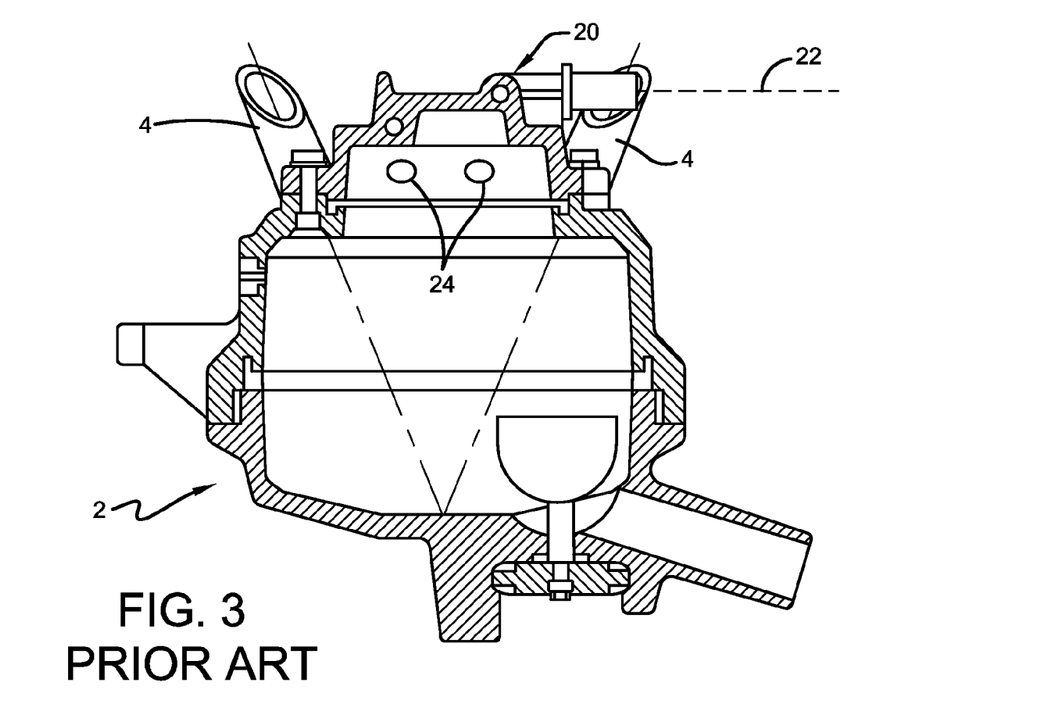
FIG. 3 is a side view of a prior art claw and air fork.
Figure 4:
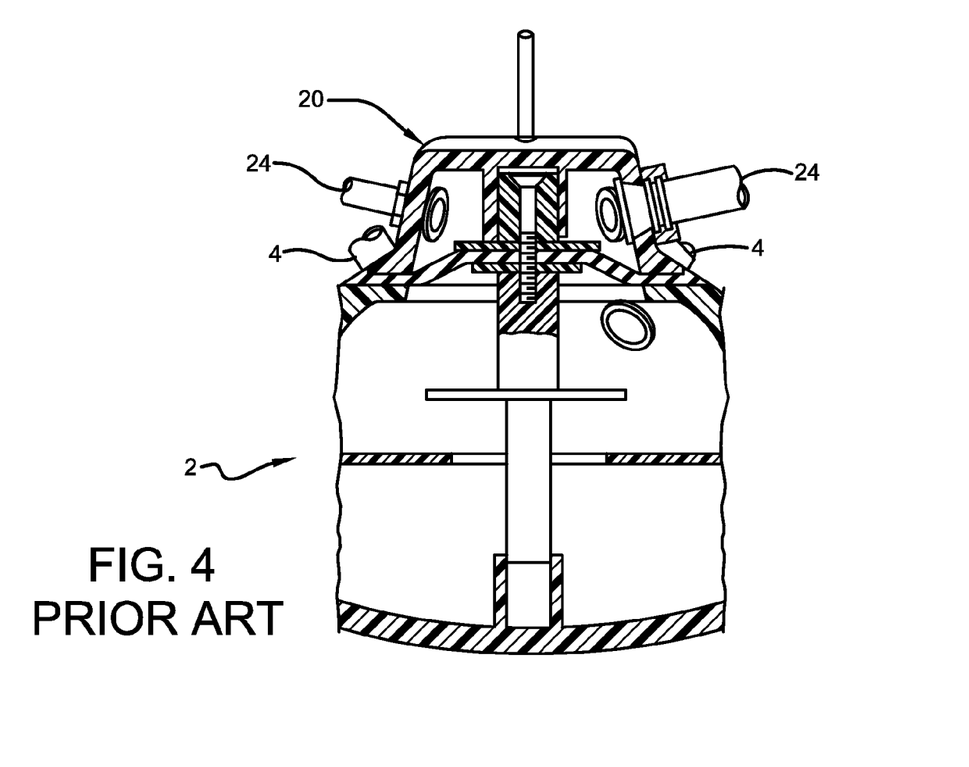
FIG. 4 is a side view of another prior art claw and air fork.
Figure 5:
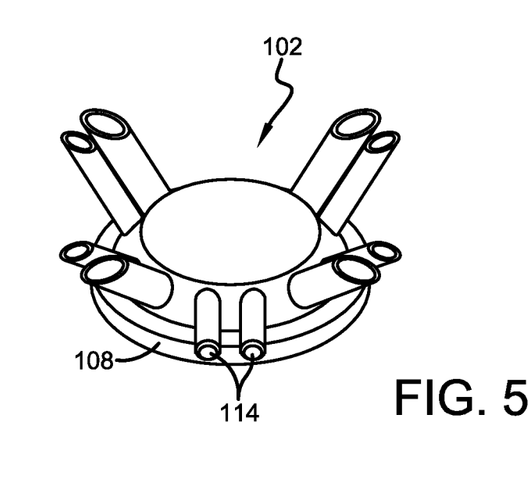
FIG. 5 is a perspective view of the top of a claw with its pulsation nipples aligned with its liner nipples.
Figure 6:
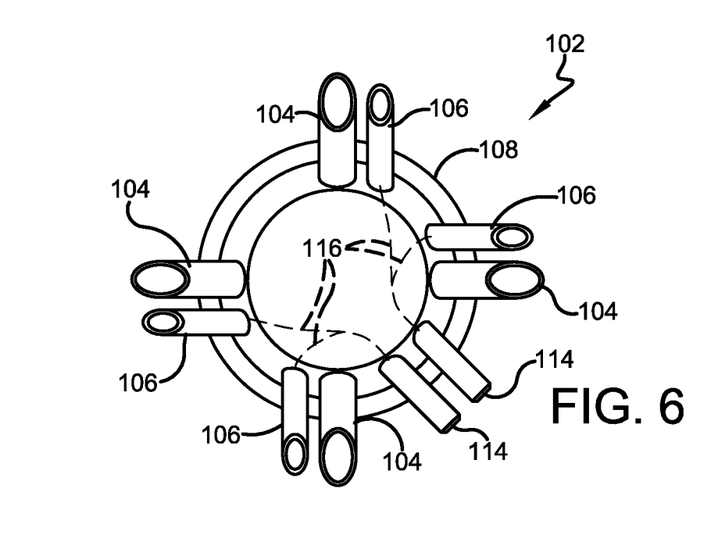
FIG. 6 is a top plan view of FIG. 5.
Figure 7:
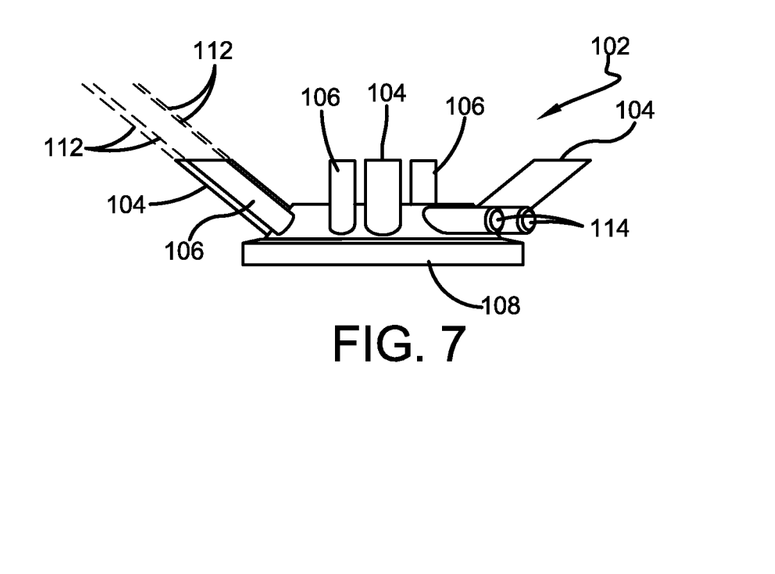
FIG. 7 is a front view of the claw of FIG. 5.
Figure 8:
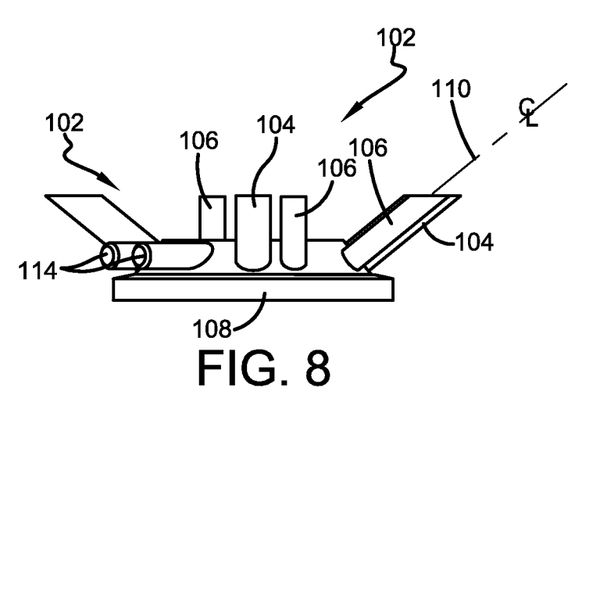
FIG. 8 is a right side view of the claw of FIG. 5.
Figure 9:
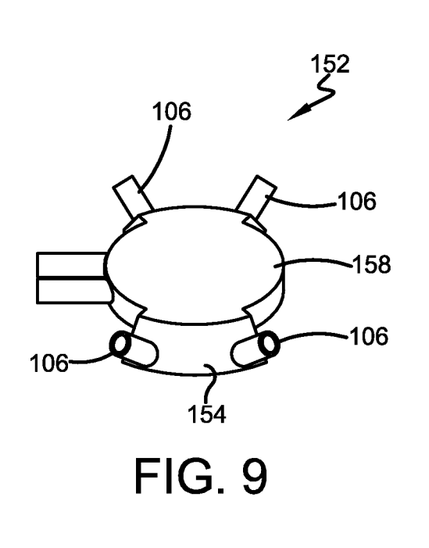
FIG. 9 is a perspective view of an air fork its pulsation nipples disposed on arms that align the pulsation nipples with liner nipples on a claw.

A pulsation cap or air divider 20 (also known as an air fork 20) is commonly mounted, incorporated into, or placed on (or used in conjunction with) claw 2. Air forks 20 are where the pulsating vacuum flow delivered through pulsation tube 22 (commonly referred to as twin tube 22) is divided to individual flows for each teat cup assembly 8. The pulsation nipples 24 of air fork 20 are commonly disposed in a plane parallel to the horizontal axis of claw 2 as shown in FIGS. 1-3 or the pulsation nipples 24 of air fork 20 are tilted up to about twenty degrees from horizontal (as shown in FIG. 4).

FIG. 1 shows how short air tubes 10 bow outwardly and can interfere with the legs 26 of the cow while in the milking position. Some cows become annoyed with this contact and will try to "shake" the unit off or the cow will continually move to try to prevent short milk tubes 10 hose from touching her leg 26. Both of these scenarios are undesirable and can result in equipment falling off which requires a milker to reattach the unit or the unit may not get reattached resulting in the cow not being fully milked out. FIG. 1 also shows the potential for the cow to lift up the leg 26 on the left and push the cluster off. Notice the split in the hoof where a short air tube 10 or short milk tube 6 could become caught. There is also the potential of the leg 26 getting caught between the short air tube and short milk tube. Either of these scenarios would likely result in continued kicking. This could cause cuts in the tubes or hoses or breaking the cluster.

SUMMARY OF THE DISCLOSURE

The configurations of this disclosure are designed to improve the milking cluster in several different ways: improved alignment of the cluster during milking, making the cluster easier to handle (attaching to cow, placing in wash position, etc.), reducing the likelihood of the cluster interfering with the cow during milking, and reducing the likelihood of the cluster being stepped on or caught in the cows hoof or leg.

The disclosure provides configurations wherein the "bowing" outwardly of the short air tubes is eliminated when the cluster is in the milking position. In one configuration the bowing is reduced or eliminating by aligning the pulsation nipples with the liner nipples such that the centerlines of each are spaced apart but generally parallel. One exemplary configuration is provided wherein the pulsation nipples and air fork are integrated with the claw. Another configuration is provided wherein the air fork is separate from the claw but positions it pulsation nipples at the ends of arms such that the pulsation nipples are aligned with the liner nipples when the air fork is disposed on top of a claw. Eliminating the bowing of the short air tubes gives the cluster a more uniform alignment under the cow and decreases the likelihood of the short air tube interfering with the cow's legs while milking. It also provides for a sleeker easier to handle cluster assembly which is advantageous to milkers during attaching and handling. The design decreases the "footprint" of the cluster which helps with a number of other things, namely: getting caught in the cow's hoof/leg when detaching, less likely to bother the cow therefore less likely to get kicked off—both of these could lead to less cuts in the short air tube.

Proper cluster alignment is desirable. Clusters should hang as evenly under the udder as the shape of the udder allows. By eliminating the outwardly bowing short air tubes, the disclosed configurations provide a more compact design thus making it easier to hang the cluster properly and adjust it after it has been hung. The disclosed configurations reduce the likelihood that the short air tube will come into contact with the cow's leg is known to push the unit out of its natural hanging position.

The disclosure also provides an integrated short milk tube and short air tube. By eliminating the detached short air tube, the unit becomes easier to handle and prevents the gap from forming between the two tubes. The integrated configuration has uniform ends that engage the nipples of the air fork and claw side-by-side. This is an advantage as speed in the parlor desirable. On many dairy operations, the milkers grab the two liners on the left side with one hand and the two liners on the right side with the other hand. They simultaneously attach the front two teats with a liner from each hand and then the back teats the same way. The traditional short air tube makes it difficult to handle all four liners in this fashion as the air tubes pull the liners in a direction different from the short milk tube. When grabbing the traditional short air tube the liner and short air tube are bending on multiple axes at different planes to get to the milking position. The disclosed configurations provide tubes that direct force to the milking liner in a consistent manner which helps the milker attach pairs of liners at the same time.

The disclosure provides one configuration of the integrated short milk tube and short air tube wherein the shell of the teat cup assembly does not need to accommodate the short air tube because the pulsation air is delivered to the shell chamber through the bead of the milking liner.

BRIEF DESCRIPTION OF THE DRAWINGS

Similar numbers refer to similar structures throughout the specification.

DETAILED DESCRIPTION OF THE DISCLOSURE

An exemplary configuration of a claw top with an integrated air fork is indicated generally by the numeral 102 in FIGS. 5-8. Claw top 102 may be fabricated from a variety of materials such as metals and plastics. Claw top 102 may be removably connected to or integrally formed with any of a variety of claw bodies. Claw top 102 includes a plurality of liner nipples 104 and a corresponding number of pulsation nipples 106. Each pair of nipples 104 and 106 that are next to each other and configured to work with a single milking liner and shell combination is a nipple pair. Claw top 102 of FIG. 5 has four nipple pairs. Each liner nipple 104 is configured to be connected with the lower end of a short milk tube and each pulsation nipple 106 is configured to be connected with the lower end of a short air tube. Each nipple 104 and 106 extends away from the upper wall 108 of claw top 102 at an extension direction. The extension direction of each nipple of a nipple pair is substantially the same. In this context, both nipples 104 and 106 extend from wall 108 at similar (within 10 degrees of each other as measured to each standard XYZ axis) angles and they may be parallel in one particular configuration. The extension direction may be defined by the direction of the imaginary centerline 110 (FIG. 8) of each nipple or may be defined by the overall direction 112 of the outer sidewall (FIG. 7) of the nipple. The outer wall of each nipple may be smooth or ribbed to add gripping surfaces to the nipples. Arranging nipple 104 and 106 in the same extension direction minimizes bowing between the short air tube and the short milk tube.

In the exemplary configuration, nipples 104 and 106 are spaced apart so that the sidewalls of the tubes may be received between the nipples. In another configuration, nipples 104 and 106 touch each other for use with integrated tubes.

Claw top 102 also includes a pair of main pulsation delivery nipples 114 that receive the pulsation tube 22 that delivers the alternating vacuum. The body of claw top 102 defines passages 116 (shown schematically) that provide fluid communication between nipples 106 and 114. These passages 116 may be defined by the body of claw top 102 or provided by separate tubing.

Figure 10:
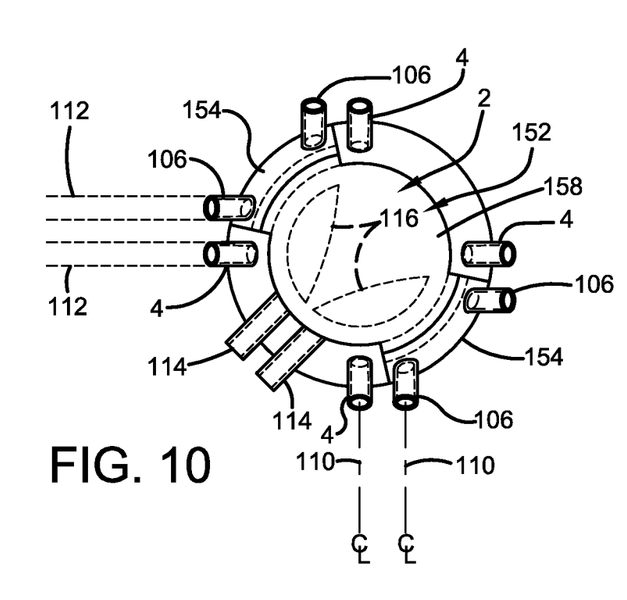
FIG. 10 is a top plan view of FIG. 9 showing the air fork used with a claw.
Figure 11:
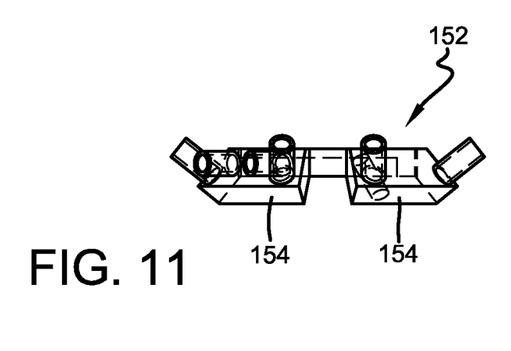
FIG. 11 is a front view of the claw of FIG. 9.
Figure 12:
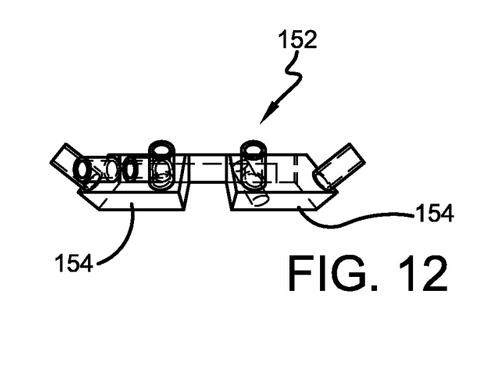
FIG. 12 is a right side view of the claw of FIG. 9.
Figure 13:
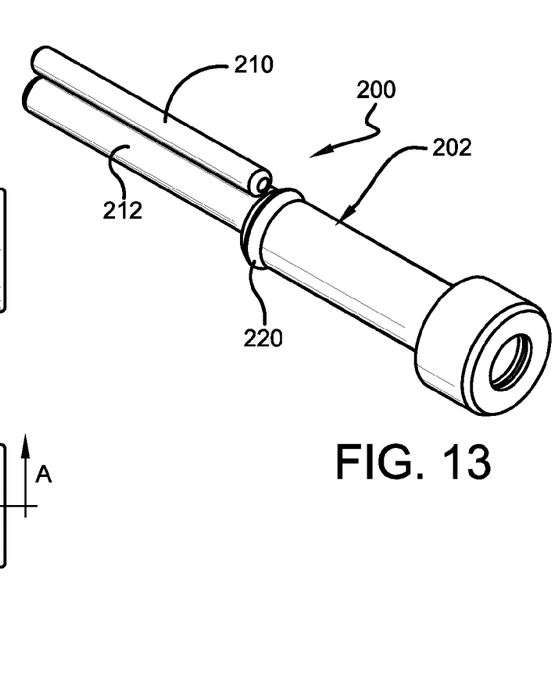
FIG. 13 is a perspective view of one configuration of a milking liner with an integrated short milk tube and short air tube.
Figure 14:
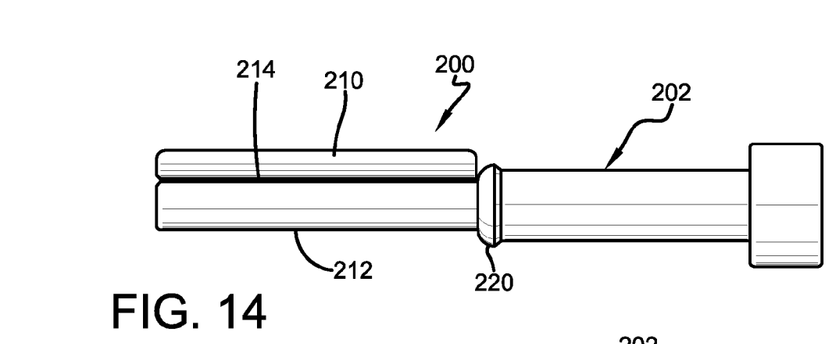
FIG. 14 is a side view of the milking liner of FIG. 13.
Figure 15:
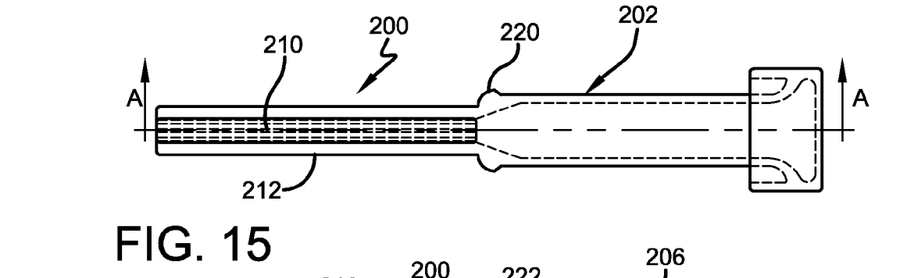
FIG. 15 is a top plan view of the milking liner of FIG. 13.
Figure 16:
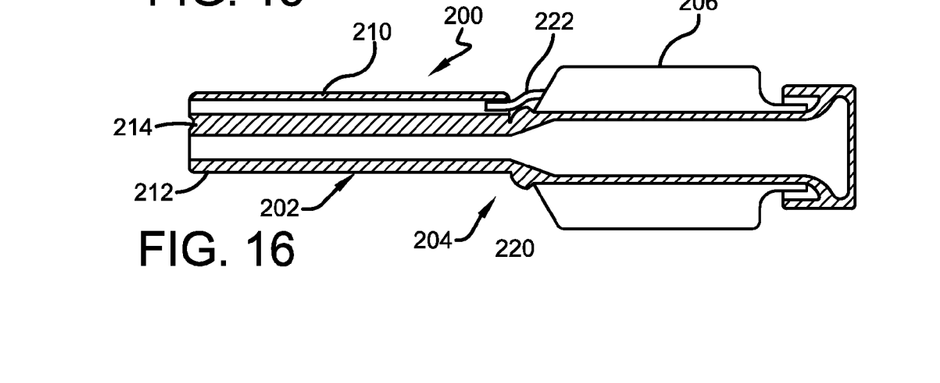
FIG. 16 is a section view taken along line A-A of FIG. 15 with a schematic shell added to show the relationship between the liner and the shell.
Figure 17:
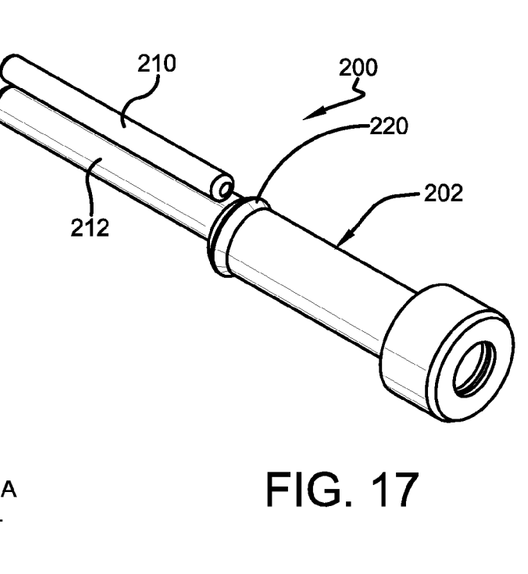
FIG. 17 is a perspective view of another configuration of a milking liner with an integrated short milk tube and short air tube.
Figure 18:
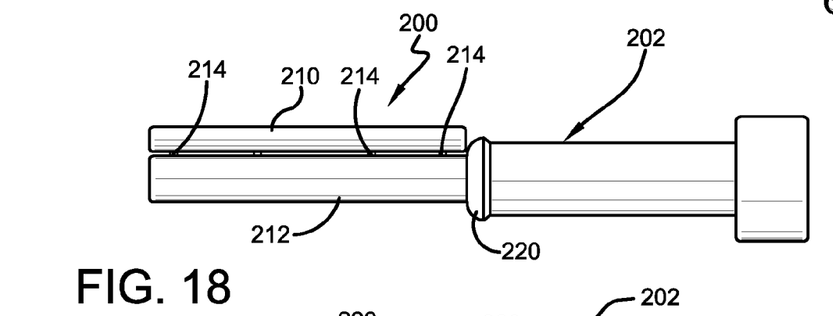
FIG. 18 is a side view of the milking liner of FIG. 17.
Figures 19, 20:
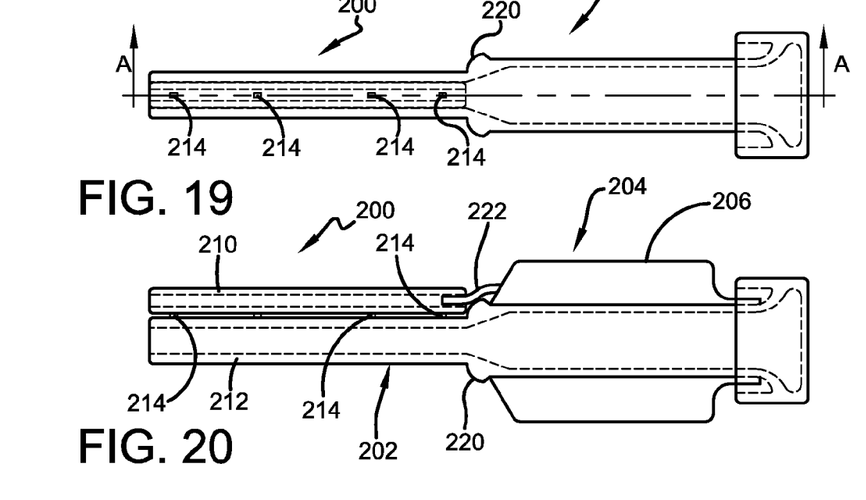
FIG. 19 is a top plan view of the milking liner of FIG. 17.
FIG. 20 is a section view taken along line A-A of FIG. 19 with a schematic shell added to show the relationship between the liner and the shell.
Figure 21:
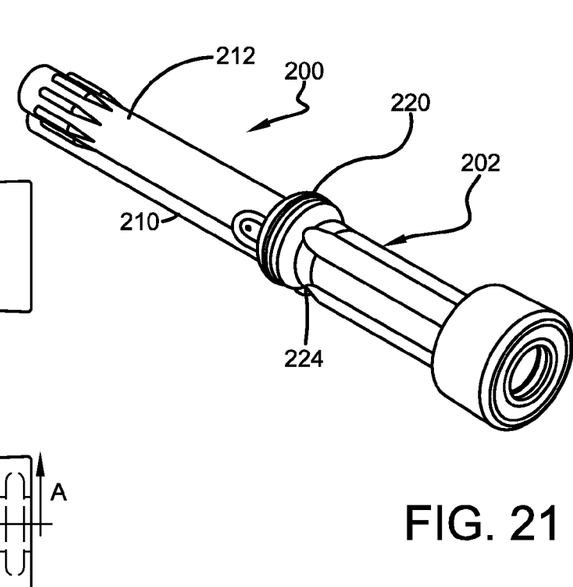
FIG. 21 is a perspective view of another configuration of a milking liner with an integrated short milk tube and short air tube.
Figure 22:
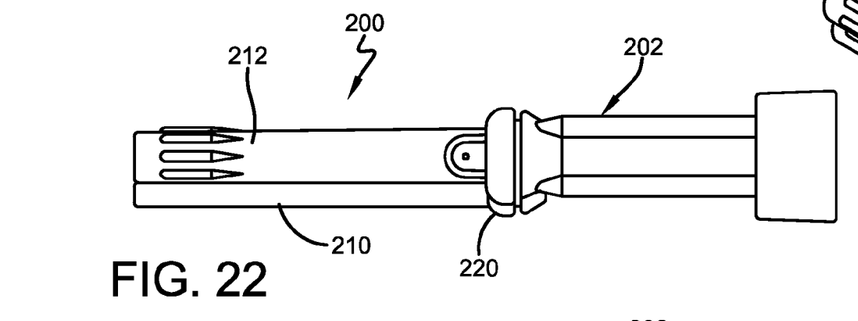
FIG. 22 is a side view of the milking liner of FIG. 21.
Figure 23:
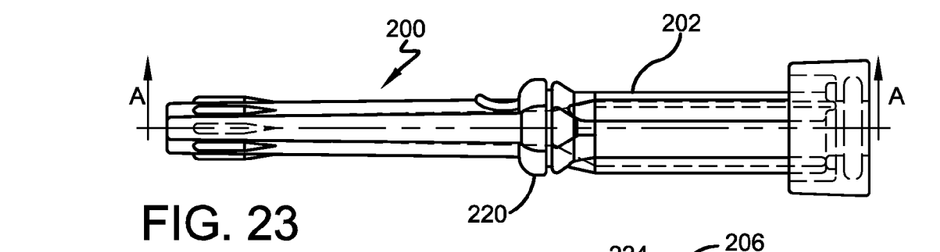
FIG. 23 is a top plan view of the milking liner of FIG. 21.
Figure 24:
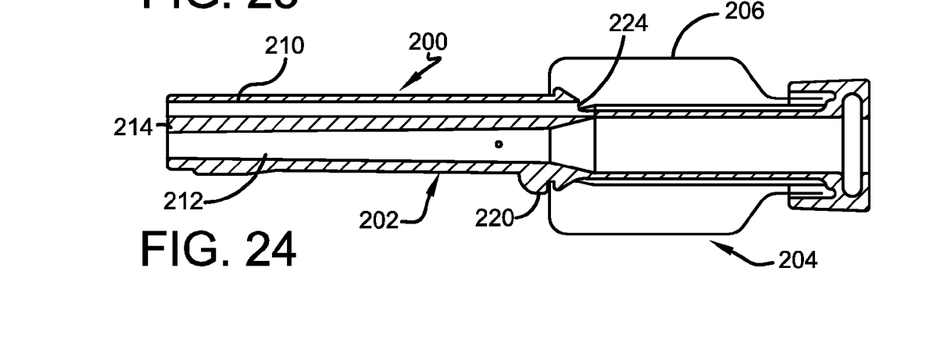
FIG. 24 is a section view taken along line A-A of FIG. 21 with a schematic shell added to show the relationship between the liner and the shell.

An exemplary configuration of an air fork for a claw 2 is indicated generally by the numeral 152 in FIGS. 9-12. Air fork 152 may be fabricated from a variety of materials such as metals and plastics. Air fork 152 is configured to be used in conjunction with a claw 2 and may be removably connected any of a variety of claws 2 for which air fork 152 is configured. Air fork 152 includes arms 154 that support pulsation nipples 106. The exemplary configuration uses a pair of spaced arms 154 that define gaps to receive liner nipples 4. In the exemplary configuration, arms 152 extend down from the main body 158 of air fork 152 and may extend outwardly and down so that they wrap around a portion of the top of claw 2 to position pulsation nipples 106 next to liner nipples 4 as shown in FIG. 10. Air fork 152 includes a pulsation nipple 106 for each liner nipple 4 of the claw 2 with which air fork 152 is to be used. When air fork 152 is properly positioned over claw 2, pulsation nipples 106 are disposed next to liner nipples 4 to define nipple pairs. Each liner nipple 4 is configured to be connected with the lower end of a short milk tube and each pulsation nipple 106 is configured to be connected with the lower end of a short air tube. Each nipple 106 extends away from arm 154 of air fork 152 at an extension direction. When air fork 152 is positioned on claw 2, the extension direction of each nipple pair is substantially the same. In this context, both nipples 4 and 106 extend at similar (within 10 degrees of each other as measured to each standard XYZ axis) angles and they may be parallel in one particular configuration. The extension direction may be defined by the direction of the imaginary centerline 110 (FIG. 10) of each nipple or may be defined by the overall direction 112 of the outer sidewall (FIG. 10) of the nipple. The outer wall of each nipple may be smooth or ribbed to add gripping surfaces to the nipples. Arranging nipple 104 and 106 in the same extension direction minimizes bowing between the short air tube and the short milk tube.

In the exemplary configuration, nipples 4 and 106 are spaced apart so that the sidewalls of the tubes may be received between the nipples. In another configuration, nipples 4 and 106 touch each other for use with integrated tubes.

Air fork 152 also includes a pair of main pulsation delivery nipples 114 that receive the pulsation tube 22 that delivers the alternating vacuum. The body 158 and arms 154 of air fork 152 defines passages 116 (shown schematically) that provide fluid communication between nipples 106 and 114. These passages 116 may be defined by the body 158 of air fork 152 or provided by separate tubing.

The disclosure also provides integrated dual short milk tube and short air tube configurations which are each generally indicated by the numeral 200 in FIGS. 13-24. The disclosure also provides a milking liner 202 that incorporates dual tube 200 as well as a liner and shell assembly 204 having dual tube 200. A variety of milking liner configurations may be used with these short air tube configurations. The configurations of FIGS. 13-24 are used in a method for delivering pulsation air to the shell 206 and a method for connecting a milking liner and claw.

In FIGS. 13-16, the short air tube 210 is connected along one side of the short milk tube 212 by a web 214 that extends substantially the entire length of short air tube 210. In other configurations, short air tube may be integrated into the body that defines short milk tube 212 in a manner similar to the configuration of FIGS. 21-24 or the passage of short air tube 210 may be formed in the sidewall of short milk tube 212. Multiple short air tubes 210 may be used. In the configuration of FIGS. 17-20, the connection between tubes 210 and 212 is with spaced webs 214 to provide more flexibility. In both configurations, milking liner 202 may be integrally molded.

The lower ends of tubes 210 and 212 terminate at a common position so they may be slipped onto nipples 204 and 206 at the same time. The common extension direction of nipples 204 and 206 allow tubes 210 and 212 to be joined together close to the lower ends and minimizes bowing between tubes 210 and 212.

In the configurations of FIGS. 13-20, the upper end of short air tube 210 terminates below the bead 220 of liner 202 so that the air nipple 222 of shell 206 may be slipped into short air tube 210 when liner 202 is connected to shell. This is shown schematically in FIGS. 16 and 20.

In the configuration of FIGS. 21-24, short air tube 210 runs into bead 220 and bead 220 defines a continuation of the passage defined by short air tube 210 with an outlet 224 disposed at an exterior portion of liner 202 that is disposed within shell 206. Multiple short air tubes 210 may be used with multiple passageways through bead 220.

The integrated tube configurations of FIGS. 13-24 allow the milker to quickly assemble the milking liner and shell combinations and connect the liners to the claw. The methods include the steps of connecting the short air tube and short milk tube to the claw nipples in one motion. The connection of the shell to the liner also forms the connection between the shell and the short air tube because the upper end of the short air tube is positioned in a fixed or predictable position with respect to the liner. The configuration of FIGS. 21-24 provide a method of delivering pulsation air to a shell without the step of separately connecting the upper end of the short air tube to a nipple on the shell. The connection of the liner with the shell automatically forms the fluid communication between the short air tube and the shell pulsation chamber.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A claw top for milking equipment; the claw top comprising:
 a claw top body;
 four liner nipples extending from the claw top body; each liner nipple extending in a liner nipple extension direction;
 four pulsation nipples extending from the claw top body; one pulsation nipple being associated with each liner nipple to define a nipple pair; each pulsation nipple extending in a pulsation nipple extension direction;
 the liner nipple extension direction being substantially the same as the pulsation nipple extension direction;
 the claw top body including a removable air fork; the pulsation nipples being carried by the removable air fork; and
 wherein the removable air fork includes a main body and a pair of arms; the pulsation nipples extending from the arms; the arms extending outwardly and downwardly from the main body to position the pulsation nipples next to the liner nipples.

2. The claw top of claim 1, wherein each pulsation nipple is spaced from the liner nipple of the nipple pair.

3. The claw top of claim 1, wherein the extension direction of the liner nipple is within ten degrees as the extension direction of the pulsation nipple.

4. The claw top of claim 3, wherein the extension direction of the liner nipple is parallel to the extension direction of the pulsation nipple.

5. The claw top of claim 1, wherein the arms are spaced apart to define gaps that receive the liner nipples.

6. A claw top for milking equipment; the claw top comprising:
 a claw top body;
 four liner nipples extending from the claw top body; each liner nipple extending in a liner nipple extension direction;
 four pulsation nipples extending from the claw top body; one pulsation nipple being associated with each liner nipple to define a nipple pair; each pulsation nipple extending in a pulsation nipple extension direction;
 the liner nipple extension direction being substantially the same as the pulsation nipple extension direction; and
 wherein the liner nipples and the pulsation nipples end at the same location from the claw top body.

7. The claw top of claim 6, wherein the claw top body includes a removable air fork; the pulsation nipples being carried by the removable air fork.

8. The claw top of claim 6, wherein each pulsation nipple is spaced from the liner nipple of the nipple pair.

9. The claw top of claim 8, wherein the extension direction of the liner nipple is within ten degrees as the extension direction of the pulsation nipple.

10. The claw top of claim 9, wherein the extension direction of the liner nipple is parallel to the extension direction of the pulsation nipple.

11. The claw top of claim 6, wherein the claw top includes a removable air fork having spaced arms; the pulsation nipples being carried by the arms of the removable air fork.

12. A claw top for milking equipment; the claw top comprising:
    a claw top body that includes a removable air fork;
    four liner nipples extending from the claw top body; each liner nipple extending in a liner nipple extension direction;
    four pulsation nipples extending from the claw top body; one pulsation nipple being associated with each liner nipple to define a nipple pair; each pulsation nipple extending in a pulsation nipple extension direction;
    each pulsation nipple being spaced from the liner nipple of the nipple pair;
    the liner nipple extension direction being substantially parallel to the pulsation nipple extension direction;
    the pulsation nipples being carried by the removable air fork; and
    wherein the removable air fork includes a main body and a pair of arms; the pulsation nipples extending from the arms; the arms extending outwardly and downwardly from the main body to position the pulsation nipples next to the liner nipples.

13. The claw top of claim 12, wherein the arms are spaced apart to define gaps that receive the liner nipples.

14. The claw top of claim 12, wherein each pulsation nipple is spaced from the liner nipple of the nipple pair.

15. A claw top for milking equipment; the claw top comprising:
    a claw top body that includes a removable air fork;
    four liner nipples extending from the claw top body; each liner nipple extending in a liner nipple extension direction;
    four pulsation nipples extending from the claw top body; one pulsation nipple being associated with each liner nipple to define a nipple pair; each pulsation nipple extending in a pulsation nipple extension direction;
    each pulsation nipple being spaced from the liner nipple of the nipple pair;
    the liner nipple extension direction being substantially parallel to the pulsation nipple extension direction;
    the pulsation nipples being carried by the removable air fork; and
    wherein the liner nipples and the pulsation nipples end at the same location from the claw top body.

16. A claw top for milking equipment; the claw top comprising: a claw top body; the claw top body including a removable air fork; four liner nipples extending from the claw top body; each liner nipple extending in a liner nipple extension direction; four pulsation nipples extending from the claw top body; one pulsation nipple being associated with each liner nipple to define a nipple pair; each pulsation nipple extending in a pulsation nipple extension direction; the four pulsation nipples being carried by the removable air fork; and the liner nipple extension direction being substantially the same as the pulsation nipple extension direction; wherein the extension direction of the liner nipple is within ten degrees as the extension direction of the pulsation nipple, and the extension direction of the liner nipple is parallel to the extension direction of the pulsation nipple.

* * * * *